UNITED STATES PATENT OFFICE.

HERMAN KRUSE, OF JERSEY CITY, AND WILLIAM C. KRUSE, OF UNION, NEW JERSEY.

INK.

1,381,648.     Specification of Letters Patent.     Patented June 14, 1921.

No Drawing.     Application filed September 3, 1919. Serial No. 321,325.

*To all whom it may concern:*

Be it known that we, HERMAN KRUSE and WILLIAM C. KRUSE, citizens of the United States, residing at Jersey City, New Jersey, and town of Union, in the county of Hudson and State of New Jersey, have invented certain new and useful Improvements in Inks, of which the following is a specification, reference being had therein to the accompanying drawing.

Our invention relates to improvements in ink and has particular reference to an ink more especially adapted for use upon mineograph or other duplicating machines.

One of the objects in view is to produce a good black ink that will dry rapidly on paper and avoid smudging while at the same time avoiding undue thickening and clogging of the ink upon the machine or stencils while in use. Another important advantage of our ink is that it will not settle in the bottom of the can while standing as other inks where barium sulfate is used as a base. We have found that by using a base of lighter material such as aluminium hydrate, there is no need of shaking the can and the ink is always ready and in good condition for immediate use. In the use of aluminium hydrate as a base with sulfonated or Turkey red oil, we have also found it preferable to neutralize the oil so as to remove the alkali or acid therefrom as set forth in our Patent 1309292 and prefer to use what is generally known as 65° T. R. O.

We prefer to use about 60 parts of Turkey red oil to about 40 parts glycerin, about 10 parts black lake and about 2½ parts brown lake, both on an aluminium hydrate base.

Of course, it will be understood that various modifications may be made in the ingredients, proportions and compounding without departing from the spirit of the invention as claimed.

We claim:

1. An improved ink comprising an alumina black base, glycerin and Turkey red oil.

2. An improved ink comprising a mixture of alumina black and brown lakes, glycerin and turkey red oil.

3. An ink of the class described comprising about 60 parts of Turkey red oil or sulfonated oil, about 40 parts glycerin and about 12½ parts of a mixture of black and brown lakes upon an aluminium hydrate base.

4. An improved ink comprising an alumina black base mixed with another color, glycerin, and neutralized sulfonated oil.

In testimony whereof we hereunto affix our signatures in the presence of two witnesses.

HERMAN KRUSE.
WILLIAM C. KRUSE.

Witnesses:
JOSEPH BERGMANN,
JOHN KRUSE.